United States Patent

Bowers

[15] 3,636,361
[45] Jan. 18, 1972

[54] RADIATION-SENSITIVE GLOSSMETER WITH MEANS TO COMPENSATE FOR ENVIRONMENTAL CONTAMINANTS

[72] Inventor: Kenneth Bowers, 1075 Space Parkway, Space 53, Mountain View, Calif. 94040

[22] Filed: May 28, 1970

[21] Appl. No.: 41,559

Related U.S. Application Data

[63] Continuation-in-part of Ser. No. 811,769, Apr. 1, 1969, abandoned.

[52] U.S. Cl. ......................250/219 DF, 250/209, 250/222, 356/212
[51] Int. Cl. ........................................................G01n 21/48
[58] Field of Search...............250/219 F, 222, 210, 209, 228, 250/218, 219 S, 219 DF, 220 R; 356/209–212

[56] References Cited

UNITED STATES PATENTS

| 3,053,986 | 9/1962 | Loepfe et al. | 250/219 F X |
| 3,089,383 | 5/1963 | Nearhoof et al. | 356/210 |
| 3,483,385 | 12/1969 | Heaslip et al. | 356/212 X |

*Primary Examiner*—Walter Stolwein
*Attorney*—Roger S. Borovoy, Alan MacPherson and Charles L. Botsford

[57] ABSTRACT

The gloss of material, such as paper, is measured by continuously comparing a first light beam reflected from the material both with a second light beam used to measure the effect of dirt and environmental contaminants on the intensity of the first light beam, and with a third light beam reflected from a gloss reference standard. Because a measure of the environmental contaminants is obtained by the second light beam, the output signal from the system gives solely the deviation of the gloss of the material from the reference gloss.

7 Claims, 5 Drawing Figures

PATENTED JAN 18 1972

INVENTOR.
KENNETH BOWERS
BY Roger L. Bowers
Alan H. MacPherson
ATTORNEYS

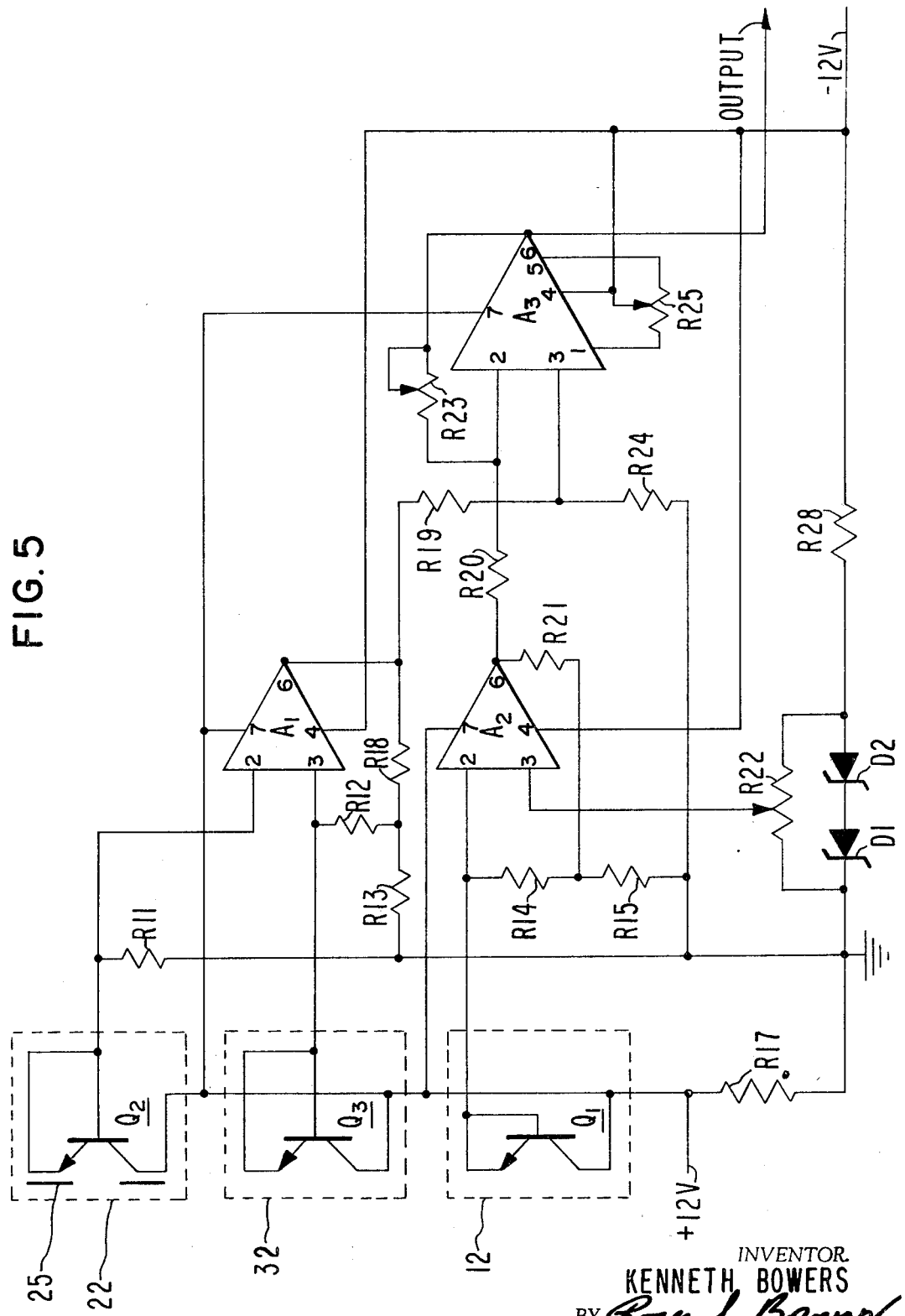

RADIATION-SENSITIVE GLOSSMETER WITH MEANS TO COMPENSATE FOR ENVIRONMENTAL CONTAMINANTS

CROSS-REFERENCE TO RELATED APPLICATION

This application is a continuation-in-part of Pat. application Ser. No. 811,769, filed Apr. 1, 1969, now abandoned.

BACKGROUND OF THE INVENTION

1. Field of the Invention

This invention relates to surface gloss measurements and in particular to apparatus for continuously measuring the gloss of a moving sheet of material and comparing the resulting gloss measurements to a reference standard.

2. Prior Art

In papermaking, gloss, defined as the characteristic of the paper's surface responsible for the paper's shiny or lustrous appearance, is an important parameter in determining paper quality. Gloss is a function of the smoothness, reflectivity, and composition, among other variables, of paper. Gloss is of such importance to the paper industry that TAPPI, the Technical Association of the Pulp and Paper industry, has specified in Method T480ts–65 the method by which gloss is to be measured.

To assist in measuring gloss, a so-called "gloss scale" has been established. The "100" on the glossmeter corresponds to reflected sodium light incident at 75° from the normal on a flat, clean, and polished surface having a refractive index of 1.540. The glossmeter reading corresponding to an ideal, completely reflecting plane mirror is 384.6 gloss units. Because of the large ranges over which gloss is measured, the gloss level scale is logarithmic.

Numerous structures have been proposed for gloss measurement. However, sufficient problems have occurred with prior art measuring instruments to make their performance sometimes less than ideal. Among these problems have been the necessity for frequent recalibration and the difficulty of operating sensitive equipment in the dusty and moist environment of a paper mill.

SUMMARY OF THE INVENTION

This invention, on the other hand, overcomes these problems of the prior art gloss-measuring systems. The structure of this solution yields accurate gloss measurements despite dust and dirt. The system of this invention is rugged, yet simple to maintain. It possesses a much faster response to changes in gloss than any gloss-measuring system heretofore proposed.

According to this invention, gloss of a material is measured by continuously comparing radiant energy reflected off the material in a first optical path both with radiant energy passed along a second optical path containing substantially the identical environment contaminants as the first optical path and with radiant energy in a third optical path reflected off a gloss reference standard. The amount of radiant energy reflected from the material varies as dirt accumulates in the environment and on the windows through which this radiant energy passes to and from the material. By providing the second optical path with windows identical to, and contiguous to, those of the first optical path, a measure of the effect of this dirt on the transmitted radiant energy is obtained.

The first and second optical paths alone, however, do not provide an accurate measure of the gloss of a material. Rather deviations in the radiant energy transmitted along these two optical paths occur from aging of the radiant energy source and changes in other system variables as well as from changes in the characteristics of the paper. To provide a gloss reference signal, a third optical path is provided. The radiant energy in this third optical path is reflected off a gloss reference standard and used continuously to calibrate the radiant energy in the first and second optical paths. Because the gloss reference standard is kept in a sealed housing, the effect of environmental dust and dirt on the first and second optical paths is continuously measured by continuously comparing the radiant energy transmitted along the third optical path to the radiant energy transmitted along the second optical path.

In accordance with this invention, the amount of radiant energy passing along the second optical path is initially set equal to the amount of radiant energy passing along the first or third optical paths. This adjustment ensures that any deviation in the total amount of radiant energy passing along the first and/or second optical paths is due to either variations in transmissivity of these optical paths, or to variations in the gloss of the material whose gloss is being measured.

As a feature of this invention, gloss is measured with infrared radiant energy. Because an incandescent lamp has considerably more energy in the infrared spectral regions than in the visible spectral regions, the lamp in the measuring unit can operate at a low voltage. Thus the lifetime of this lamp is several times longer than the lifetime of lamps used in prior art systems. Moreover, because fluorescent additives to paper fluoresce in the visible region but not in the infrared region, the use of infrared gives a more accurate gloss readout with respect to papers which use such additives, than does visible light used in prior art gloss-measuring systems. An additional advantage from the use of infrared radiant energy to measure gloss derives from the fact that the penetration of radiant energy through paper is directly proportional to frequency and inversely proportional to wavelength. Because infrared has a long wavelength, the amount of radiant energy transmitted into the paper is reduced and the amount of radiant energy reflected from the paper is increased. This enables more accurate gloss measurements to be obtained.

Finally, the photodiodes used in this system possess extremely fast response. Many papers have mottled surfaces. A true measurement of gloss is a statistical measurement of the deviation, in a statistical sense, of the instantaneous gloss on a small portion of a paper from some average gloss. Prior art glossmeters are not capable of the rapid response necessary to detect such gloss variations in a moving sheet of paper. The gloss system of this invention, however, is capable of responding to gloss changes in microseconds and thus is particularly adaptable for use in a computer-controlled processing system requiring continuous and rapid input of changes in the gloss characteristics of the paper.

Because the light reflected from the material whose gloss is being measured is continuously compared to a reference standard, deviations in gloss from a desired value can be instantly determined and corrected for. In high-speed paper mills where paper is rolled from the calender at speeds in excess of 2000 feet per minute, instantaneous determination of gloss is not only essential to prevent large waste but necessary to guarantee paper quality to customers. This invention is compatible with providing a continuous record of the gloss of the paper in each paper roll as evidence of paper quality.

While this invention will be described in terms of measuring the gloss of paper, it should be understood that this invention can also be used to measure the reflectivity of other materials and surfaces. It should also be noted that the word "light" is used throughout the specification and claims to denote radiant energy in the wavelength range comprising infrared and visible electromagnetic radiation.

DESCRIPTION OF THE DRAWINGS

FIG. 5 shows in more detail the structure of computer 3 in FIG. 1.

DETAILED DESCRIPTION

Figure 1:
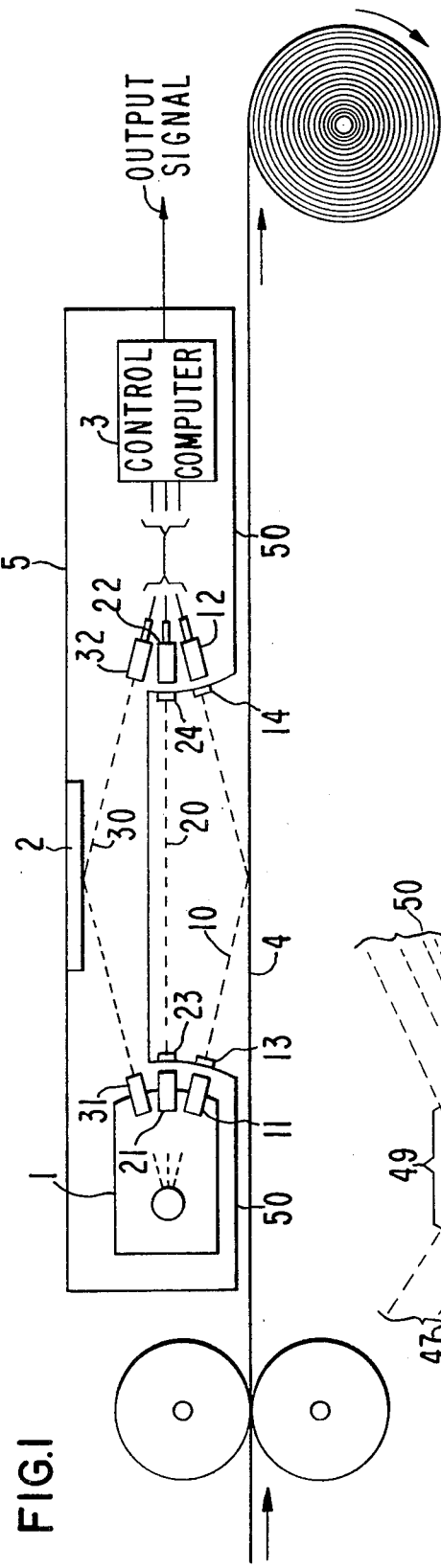
FIG. 1 shows schematically the structure of this invention.

FIG. 1 shows the glossmeter sensing unit of this invention. The sensing unit is positioned, as shown, next to a sheet of the material whose gloss is being measured. Typically, this material is paper in the process of being wound into rolls after having come from the calender. However, the glossmeter sensing unit in FIG. 1 can, of course, be used to measure the gloss of any reflecting material.

The glossmeter sensing unit is positioned a select distance above the material, typically one-quarter inch plus or minus one-eighth inch. Light from light source 1 is then transmitted along optical paths 10, 20 and 30. Each optical path contains a corresponding collimating lens 11, 21, or 31 and a focusing lens combined with a photodiode in sensing units 12, 22 and 32. The lenses used in this invention are of well-known design and thus will not be described in detail.

The radiant energy which follows optical path 10 passes through collimating lens 11 and window 13. This energy is then reflected off one surface of the material 4 whose gloss is being measured. This reflection is predominantly specular—that is, the reflected light is in the plane formed by the incident rays and the normal to the paper—as opposed to diffuse. The reflected energy is then passed through window 14 back into the glossmeter housing. This reflected energy is detected by sensing unit 12 which contains a focusing lens and a photodiode. Detecting unit 12 produces an output current proportional to the intensity of the reflected light.

The light in optical path 30 passes through collimating lens 31 and is reflected from gloss reference standard 2. Sensing unit 32, containing a focusing lens and a photodiode, then produces an electrical current proportional to the intensity of the light reflected from reference standard 2. Reference standard 2 is located within the sealed housing 5 of the glossmeter sensing unit. Thus environmental dirt and dust and other contaminants do not coat the surface of the reference standard and it remains clean, despite the fact that the outside air is often quite contaminated.

Now dirt and dust in the environment coat windows 13 and 14 through which the radiant energy in optical path 10 must pass. As a result, even though detecting units 12 and 32 are very carefully matched and even though the same amount of radiant energy passes through collimating lenses 11 and 31, the light detected by sensing unit 12 is not, in general, equal to the reflected light detected by sensing unit 32. This is so even when the gloss of reference standard 2 is identical to the gloss of material 4. Rather, a certain amount of light is reflected back toward the light source 1 by dirt and other contaminants on the outside of window 13 and another amount of light is reflected back toward material 4 by dirt and contaminants on the outside of window 14. Dust in the environment also scatters light and further reduces the amount of light transmitted from source 1 to sensing unit 12.

To compensate for the effect of environmental contaminants on the output current from sensing unit 12, optical path 20 is provided. In path 20, light from source 1 passes through collimating lens 21, window 23, and then directly through the environment into window 24. This light is detected by sensing unit 22. Because windows 23 and 24 are covered by approximately the same amount of dirt as windows 13 and 14 and because the environment between these windows contains approximately the same amount of dust as does the environment between windows 13 and 14, the light passing through windows 23 and 24 is attenuated approximately the same amount as the light passing through windows 13 and 14. The difference between the electrical signals produced by sensing units 22 and 32 thus is a good measure of the effect of environmental contaminants on the output signal produced by sensing unit 12.

Control computer 3, shown in more detail in FIG. 5, then receives the electrical signals from sensing units 12, 22 and 32 and processes these electrical signals to provide the desired comparison of the gloss of material 4 to gloss of reference standard 2.

As shown in FIG. 5, the light passed along reference path 20 (FIG. 1) is detected by photodiode $Q_2$ in sensing unit 22. The light transmitted along optical path 30, on the other hand, is detected by photodiode $Q_3$ in sensing unit 32. Photodiodes $Q_2$ and $Q_3$ comprise as shown, phototransistors whose emitters are connected directly to their bases. The output currents generated by photodiodes $Q_2$ and $Q_3$ are passed through resistors R11 and R12 respectively. The voltages generated across these resistors are then transmitted to inputs 2 and 3 on differential amplifier $A_1$. Amplifier $A_1$ produces an output voltage only when the two input voltages to this amplifier differ. Thus, when the amount of light detected by photodiode $Q_2$ equals the amount of light detected by photodiode $Q_3$, the voltage drops across resistors R11 and R12 are equal and amplifier $A_1$ produces zero output voltage.

Light in optical path 10 (FIG. 1) is detected in sensing unit 12 by photodiode $Q_1$, also a transistor whose emitter has been connected directly to its base. The output current from photodiode $Q_1$ is transmitted through resistors R14 and R15 to ground. The voltage drop across resistor R14 is the voltage on input 2 of differential amplifier $A_2$. The voltage on input 3 of amplifier $A_2$ is produced by setting the wiper arm on tuning potentiometer R22 to a selected reference value. Back-biased zener diodes D1 and D2 precisely control the voltage drop across tuning potentiometer R22. When the gloss of material 4 (FIG. 1) is the proper value, the light reflected from material 4 which reaches photodiode $Q_1$ generates a voltage across resistance R14 which precisely matches the voltage produced by tuning potentiometer R22 on input 3 of amplifier $A_2$. Under this condition, amplifier $A_2$ produces zero output voltage.

The output signals from amplifiers $A_1$ and $A_2$ are transmitted to inputs 2 and 3 respectively of differential amplifier $A_3$. When the output voltages from amplifiers $A_1$ and $A_2$ are both zero, the input signals to amplifier $A_3$ are zero and amplifier $A_3$ produces zero output voltage. This occurs when the gloss of paper 4 matches precisely the gloss of reference standard 2.

As discussed above, dirt and dust accumulate on, and in the environment between, windows 13, 14, 23, and 24 and thus affect the amount of light transmitted along optical paths 10 and 20. Computer 3 automatically compensates for the reduction in the amount of light transmitted along optical paths 10 and 20 due to this dirt. To do this, computer 3 must be properly calibrated. To calibrate this computer, light source 1 is turned on. Windows 13, 14, 23 and 24 are carefully cleaned. Then the signal produced by photodiode $Q_2$ is compared to the signal produced by photodiode $Q_3$ from light r reflected from gloss reference standard 2 (FIG. 1). When the signals produced by $Q_2$ and $Q_3$ are precisely equal, amplifier $A_1$ produces zero output voltage. If signals produced by the two photodiodes $Q_2$ and $Q_3$ are not precisely equal, iris 25, in front of photodiode $Q_2$, is adjusted to equalize these signals.

Next, reflecting material 4 in optical path 10 is replaced by a gloss reference standard identical to reference standard 2. The output current produced by photodiode $Q_2$ should now equal the output current produced by photodiode $Q_1$ because photodiode $Q_1$ generates a current proportional to the amount of light reflected from a reference standard identical to reference standard 2. Reference potentiometer R22 is then adjusted until the output voltage produced by amplifier $A_2$ becomes zero. At this time, the output voltage from both amplifier $A_1$ and $A_2$ are zero. Consequently, the output voltage produced by amplifier $A_3$ should be zero at this time.

However, if the voltage from amplifier $A_3$ is not zero, it is set to zero by adjusting tuning potentiometer R25 until the output voltage from $A_3$ is zero. The gain of amplifier $A_3$ is adjusted by adjusting potentiometer R23.

The glossmeter is now ready for operation. As the glossmeter operates, dirt and dust accumulate on and between windows 13, 14, 23 and 24. However, because reference path 20 is adjacent to optical path 10, which contains the light reflected by material 4, any change in the total amount of light transmitted along optical path 10 due to this dirt and dust is balanced by a corresponding change in the total amount of light transmitted along optical path 20. The net change in output voltage from amplifier $A_1$ should thus match the net change in output voltage from amplifier $A_2$, and the output voltage from amplifier $A_3$, equal to the difference between the output voltages from $A_1$ and $A_2$, should remain zero.

Now, if the gloss of material 4 changes from the reference gloss, the output voltage from amplifier $A_2$ will deviate an additional amount corresponding to this gloss change. This will change the output voltage of amplifier $A_3$ from zero to some value proportional to the gloss change of material 4. Thus the output voltage from amplifier $A_3$ will represent solely a change in gloss and not the accumulation of dirt and dust on the windows 13, 14, 23 and 24.

The output voltage from amplifier $A_3$ is then fed to a console containing a meter calibrated in relative gloss units. When the output voltage from $A_3$ is zero, the meter ill remain at its zero setting. But as the voltage from amplifier $A_3$ deviates from its nominal setting by a positive or negative amount, this meter will likewise deviate from its nominal setting by a corresponding amount. Thus an operator is able to determine easily the deviation of gloss from its required value and to correct the production process to bring the material gloss back within specification.

Typical values for the circuit components shown in FIG. 5 are listed below.

| | |
|---|---|
| $Q_1, Q_2, Q_3$ | FPT 100 |
| $A_1, A_2$ | ADO 27B |
| $A_3$ | µA741 |
| D1, D2 | FZ901 |
| R11 | 100 KΩ |
| R12 | 100 kΩ |
| R13 | 100 ohms |
| R14 | 100 kΩ |
| R15 | 100 ohms |
| R17 | 15 kΩ |
| R18 | 10 kΩ |
| R19 | 1 KΩ |
| R20 | 1 kΩ |
| R21 | 10 kΩ |
| R22 | 100 kΩ (Potentiometer) |
| R23 | 10 kΩ (Potentiometer) |
| R24 | 10 KΩ |
| R25 | 10 kΩ (Potentiometer) |
| R28 | 15 kΩ |
| Light Source | GE 1561 |

A control computer for a glossmeter built using the above component values, functioned as described and satisfactorily indicated only a deviation of the gloss of a material from a gloss reference standard.

Figure 2:
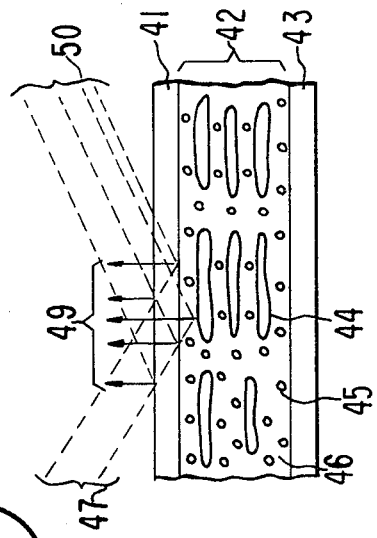
FIG. 2 shows the cross section of a typical sheet of paper.

As noted above, gloss is an important parameter in determining the quality of paper. FIG. 2 shows a typical cross section of paper. Paper consists of a matrix of finely chopped wood cellulose fibers 44 randomly arranged and surrounded by a filler material 46 comprising starch with some moisture 45 interspersed. Finely ground clay forms coatings 41 and 43 on the two surfaces of the paper. Typically the interior filler material is 1 to 3 mils thick, while the clay layers 41 and 43 are around 0.25 mils thick. Shown in FIG. 2 are parallel light rays 47 incident on the upper surface of the paper, light rays 50, specularly reflected by the paper and light rays 49 diffusely reflected by the paper. As can be visualized from FIG. 2, the total intensity of light reflected from the paper is a function not only of the light reflected by the upper surface of clay layer 41, but also of the light reflected both by the interface between layer 41 and filler material 42 and by the cellulose wood fibers 44 within the paper. Furthermore, some light is, of course, reflected by starch material 46 and moisture 45 contained within the filler material. Also a certain amount of light passes through the paper and some light is reflected back by the other discontinuities in the paper. If the incident light beam is narrow enough, the amount of light reflected will vary depending upon whether a wood fiber 44 or filler material 46 is directly beneath the incident rays. In the usual situation, however, the light beam being reflected is many times wider than the largest wood fibers 44 contained in the filler material 42, and thus the light reflected represents the average wood fiber content in the illuminated portion of the paper. However, the sensing units used in this invention have a rapid enough response, on the order of several microseconds, to detect rapid fluctuations in the intensity of the specularly reflected light. Such fluctuations are caused, for example, by sudden changes in the wood fiber content of the paper or in the surface characteristics of the paper. These changes give the paper a mottled effect. Furthermore, as the diameter of the light beam is decreased, the system of this invention yields gloss measurements from smaller and smaller portions of the paper until finally the gloss measurements can be used as an indication of the wood fiber content of, and distribution in, the paper.

Figure 3:
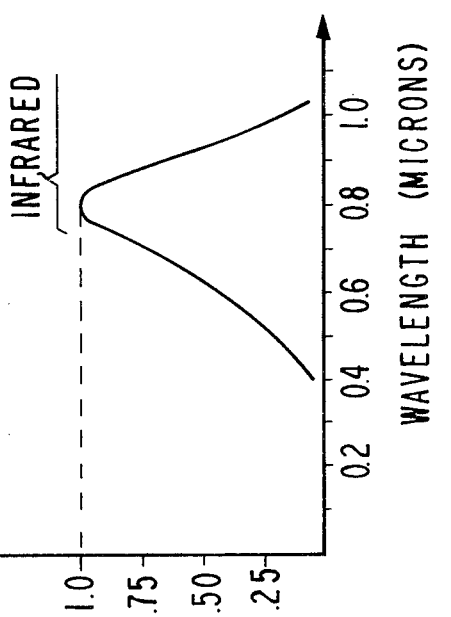
FIG. 3 shows spectral response of the photodiodes used in this invention.
Figure 4:
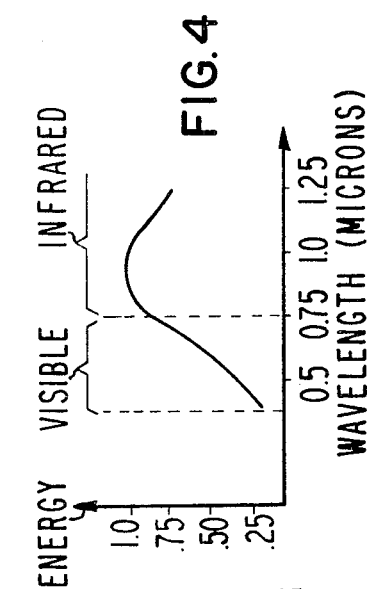
FIG. 4 shows the energy vs. the frequency characteristic of light source 1 in FIG. 1.

The use of photodiodes with optimum spectral response in the near infrared regions, as shown in FIG. 3, allows light source 1 (FIG. 1) to be operated at a low voltage and still produce the amount of energy necessary to obtain meaningful measurements of gloss. FIG. 4 shows the energy distribution with wavelength of a typical incandescent lamp. From FIG. 4 it is clear that maximum energy is produced in the near infrared region where the light has wavelengths from 0.75 to 1.1 microns. Thus, the light source can be run at approximately 80 percent of its rated voltage, thereby increasing the life of a lamp by about 20 times, while at the same time producing adequate energy for the sensing unit photodiodes. Furthermore, any change with time of the intensity of light from source 1 (FIG. 1) is automatically compensated for the processing logic of control computer 3 assuming, of course, that the intensity changes equally in all three optical paths 10, 20 and 30.

What is claimed is:

1. Structure comprising:
    a radiant energy source;
    a first sensing means;
    first path means for transmitting radiant energy from said source to the surface of a material and for transmitting radiant energy reflected from said surface to said first sensing means, said first sensing means producing a first intermediate signal representing the radiant energy from said source reflected by said surface;
    a second sensing means;
    second path means for transmitting radiant energy from said source through substantially the same environment passed through by the radiant energy transmitted by said first path means to said second sensing means, said second sensing means producing a second intermediate signal representing the radiant energy transmitted through said second path means;
    a third sensing means;
    third path means for transmitting radiant energy from said source to the surface of a reference standard and for transmitting the radiant energy reflected by said reference standard to said third sensing means, said third sensing means producing a third intermediate signal representing the radiant energy reflected by said reference standard; and
    means for processing said first, said second and said third intermediate signals to provide a measure of the radiant energy reflected by said surface of a material, said measure being independent of environmental contaminants which interfere with the radiant energy transmitted through said first path means.

2. Structure as in claim 1 in which said radiant energy source produces maximum energy in the infrared region and said first, second, and third sensing means detect predominately, infrared energy.

3. Structure as in claim 1 in which said means for processing comprises:
    a first amplifier means for receiving said second and third intermediate signals and for producing a first output signal proportional to the difference between said second and third intermediate signals, this difference representing the effect of environmental contaminants on the radiant energy detected by said first sensing means;

a second amplifier means for producing a second output signal representing the difference between said first intermediate signal and a reference signal, said second output signal representing the effect of either environmental contaminants, or a deviation from nominal of the gloss of the surface of said material; and a third amplifier means for producing a third output signal from said first and second output signals, this third output signal representing solely a deviation from the reference standard gloss of the gloss of the surface of said material.

4. Structure as in claim 1, in which said radiant energy source, said reference standard, and said first, second, and third sensing means are contained within a sealed housing.

5. Structure as in claim 4, in which said first, second, and third path means each contain a collimating lens and a focusing lens;

said first and second path means contain windows in said housing allowing radiant energy to pass first from said housing to said environment and then from said environment back into said housing; and said second path means contains an adjustable iris to control the amount of light passing to said second sensing means.

6. Structure for measuring the deviation of the gloss of a material from a nominal gloss value, which comprises:

means for continuously producing a first signal representing the light reflected off a material whose gloss is to be measured;

means for continuously producing a second signal representing the light reflected off a gloss reference standard;

means for continuously producing a third signal representing the effect on said first signal of contaminants in the environment passed through by the light reflected from said material; and means for processing said first, second and third signals to produce a measure of the gloss of said material which is substantially independent of environmental contaminants in the path followed by the light reflected off the material whose gloss is being measured.

7. Structure which comprises:

means for continuously producing a first signal representing radiant energy reflected by a material;

means for continuously producing a second signal representing radiant energy reflected by a reference standard;

means for continuously producing a third signal representing radiant energy passed through an environment containing substantially the same contaminants as the environment passed through by the radiant energy reflected by said material; and means for processing said first, second and third signals to produce a measure of the reflectivity of said material which is substantially independent of environmental contaminants in the path followed by the radiant energy reflected by the material.

* * * * *